United States Patent [19]
Yang

[11] 3,746,274
[45] July 17, 1973

[54] STOP SENSITIVE RETRACTOR

[75] Inventor: Elmer Chen-Sheng Yang, Anaheim, Calif.

[73] Assignee: Pacific Scientific Company, Anaheim, Calif.

[22] Filed: Feb. 17, 1971

[21] Appl. No.: 116,092

[52] U.S. Cl. .......................................... 242/107.4
[51] Int. Cl. ............................................. A62b 35/00
[58] Field of Search ................. 242/107 SB, 107.4, 242/107.6, 107.7; 297/388; 280/150 SB

[56] References Cited
UNITED STATES PATENTS

| | | | |
|---|---|---|---|
| 3,558,075 | 1/1971 | Stoffel | 242/107.4 |
| 3,598,336 | 8/1971 | Frost | 242/107.4 |
| 3,289,970 | 12/1966 | Board et al. | 242/107.4 |
| 3,412,952 | 11/1968 | Wohlert et al. | 242/107.4 |

*Primary Examiner*—Werner H. Schroeder
*Attorney*—Fowler, Knobbe & Martens

[57] ABSTRACT

A seat belt reel urged into wound position is prevented from unwinding by a lock bar engaging ratchet teeth formed on the reel. A reset cam on a speed reducing gear mechanism driven by the reel holds the lock bar away from the ratchet teeth when the belt is fully wound to permit initial unwinding of the belt. A pair of disks rotating with the reel are viscously connected to a disk pivotally mounted on the reel shaft, so that the pivotal disk is urged to rotate with the reel. A finger on the pivotal disk holds the lock bar out of engagement with the ratchet teeth during initial unwinding of the belt. Upon interruption of the unwinding movement, a spring urges the pivotal disk to pivot to release the lock bar and to cause the lock bar to engage the ratchet teeth so that further unwinding of the reel is prevented.

The reset gear mechanism includes an inner gear eccentrically mounted on the reel shaft and restrained from rotation so that it moves in an orbital path. An outer gear is provided with a ring of teeth surrounding the teeth of the inner gear and which are dimensioned to mesh with the teeth of the inner gear so that as the inner gear moves in its orbital path, the outer gear rotates one tooth for each cycle of the inner gear. The outer gear has more teeth than the inner, with the result that the outer gear rotates. The reset cam which is formed on the outer gear is angularly oriented and the speed reducing gears are so arranged to only hold the lock bar out of engagement with the ratchet teeth when the belt is near its fully wound position.

31 Claims, 12 Drawing Figures

PATENTED JUL 17 1973

INVENTOR.
ELMER CHEN-SHENG YANG

BY
FOWLER, KNOBBE
& MARTENS
ATTORNEYS

INVENTOR.
ELMER CHEN-SHENG YANG
BY
FOWLER, KNOBBE
& MARTENS
ATTORNEYS

STOP SENSITIVE RETRACTOR

This invention relates to a retractor for a seat belt or other restraining element, and more specifically, to an improved arrangement for preventing further unwinding of a seat belt once it has been initially unwound to a desired position. The invention further relates to an improved arrangement for permitting initial unwinding of the belt and for resetting the means which initiates the locking of the belt after the unwinding.

Early versions of the seat belt retractors performed only the basic function of retracting the belt when it was released, the seat belt being locked in its operative position by manual means. However, many additional requirements have since been established for retractors, a primary one being that of performing automatic belt locking functions to prevent further unwinding of the belt after it has been initially adjusted. Various types of retractors have been developed for this purpose including those which remain unlocked until rapid deceleration occurs and then operate on an inertia principle; and those which automatically lock with slight retracting movement or with a predetermined time delay after start of initial unwinding.

While there are many advantages of these various arrangements, they all have shortcomings. Accordingly, a need exists for a retractor which will automatically lock the belt without having the characteristics of the types mentioned. That is, without requiring inertia forces, some retracting movement of the belt, or a predetermined delay to elapse from the time that unwinding commences. An overriding consideration for any retractor is that it should be highly reliable while yet being simple to operate and inexpensive to manufacture. Another requirement which becomes important, particularly in the use of retractors for aircraft is that the mechanism should be compact and lightweight.

In accordance with the structure and method of the present invention there is provided a retractor which is sensitive to the stopping movement of a belt or other restraining element at the end of initial unwinding or adjustment of the belt. That is, as soon as the unwinding movement is interrupted, the retractor locking mechanism is initiated so that further unwinding is immediately prevented. More specifically, in a preferred arrangement the retractor includes a belt wound on a flexible storage member such as a reel rotatably mounted on a support. A spring or other power means normally urges the belt into its fully wound position. A lock such as a bar pivotally mounted on the support is movable into engagement with ratchet teeth on the reel. Means are provided to sense the interruption of initial unwinding movement and initiate movement of the bar into locking position.

A reset cam driven by the reel through a speed reducing mechanism associated with movement of the reel is employed to permit initial unwinding of the reel. A pair of disks are mounted in face to face relation on the reel shaft with a layer of viscous material between them. One of the disks is fixed to rotate with the reel shaft while the other disk is pivotally mounted on the shaft. The viscous medium causes the pivotal disk to rotate with the other; however, stops are provided to permit only limited pivotal movement of the driven disk. The pivotal or driven disk is provided with means for cooperating with the lock bar. Upon initial unwinding movement of the reel the pivotal disk is moved a slight distance with the rotating disk into a position where it holds the lock bar out of engagement with the ratchet teeth on the reel. When the unwinding movement is interrupted, a spring urges the pivotal disk against the viscous drag of the viscous medium into a position wherein the locking bar can engage the ratchet teeth to prevent further unwinding movement.

Upon release, the belt is automatically retracted and the reset cam, whose movement is responsive to the rotation of the reel, engages the lock bar to render it inoperative when the reel approaches its fully wound position. This cam is mounted on a gear which is rotatably mounted on the reel shaft and which includes an inwardly extending ring of teeth that mate with teeth on an inner gear that is eccentrically mounted on the reel. The inner gear is restrained from rotation so that it moves in an orbital path and the diameter of the ring of teeth in the outer gear is dimensioned to mesh with the teeth of the inner gear as it is moved in its orbital path. By providing the outer gear with more teeth than the inner gear, a very effective speed reducing mechanism is provided, so that one revolution of the reel produces only limited rotational movement of the outer gear. Hence by properly positioning the cam on this outer gear, and obtaining the desired speed reduction, the cam is only moved to hold the locking bar out of engagement with the ratchet teeth when the belt is in its fully wound position. Thus, the reset mechanism provides a unique means for rendering a function inoperative during a certain zone of rotational operation.

For a more thorough understanding of the invention, refer now to the following detailed description and drawings in which.

Figure 1:
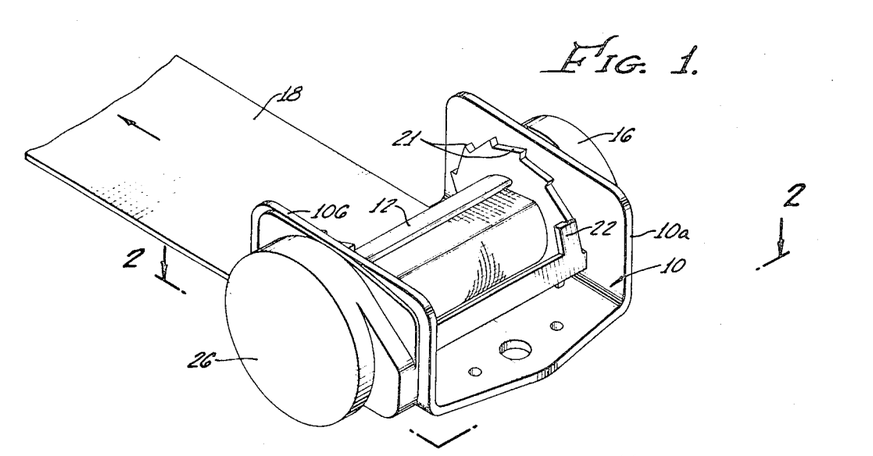
FIG. 1 is a perspective view of the exterior of the seat belt retractor of the invention illustrating the lock bar and the configuration of the overall assembly.
Figure 2:
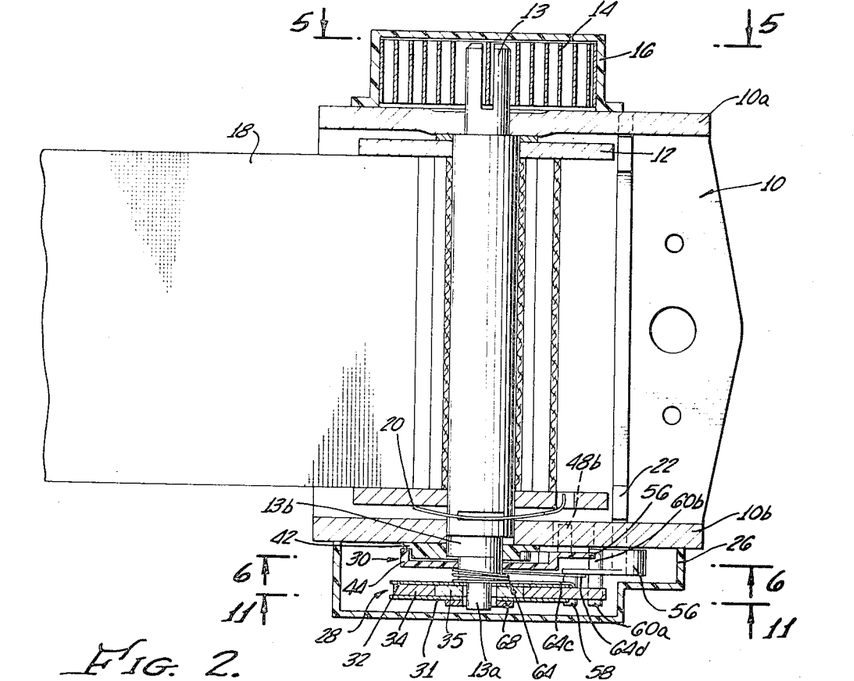
FIG. 2 is a cross-sectional view of the retractor of FIG. 1 taken on line 2—2 showing the retractor mechanism in cross-section.

Referring first to FIGS. 1 and 2, the novel apparatus which embodies this invention includes a U-shaped support 10 preferably made of aluminum or other strong lightweight material. A storage member in the form of a spool like reel 12 is rotatably mounted in the support 10 with the reel shaft 13 extending through the support. A spiral power spring 14 encircles one end of the shaft 13 of the reel 12, one end of the spring being secured to the shaft while the other end of the spring is secured to a cap 16 attached to the support. A flexible restraining element in the form of a webbing or belt 18 has one end secured to the reel 12 to wind the belt 18 onto the reel. A spring 20 shown in FIG. 2 on the shaft 13 rotates with the reel and axially positions the reel with respect to the support 10.

Figures 3, 4:
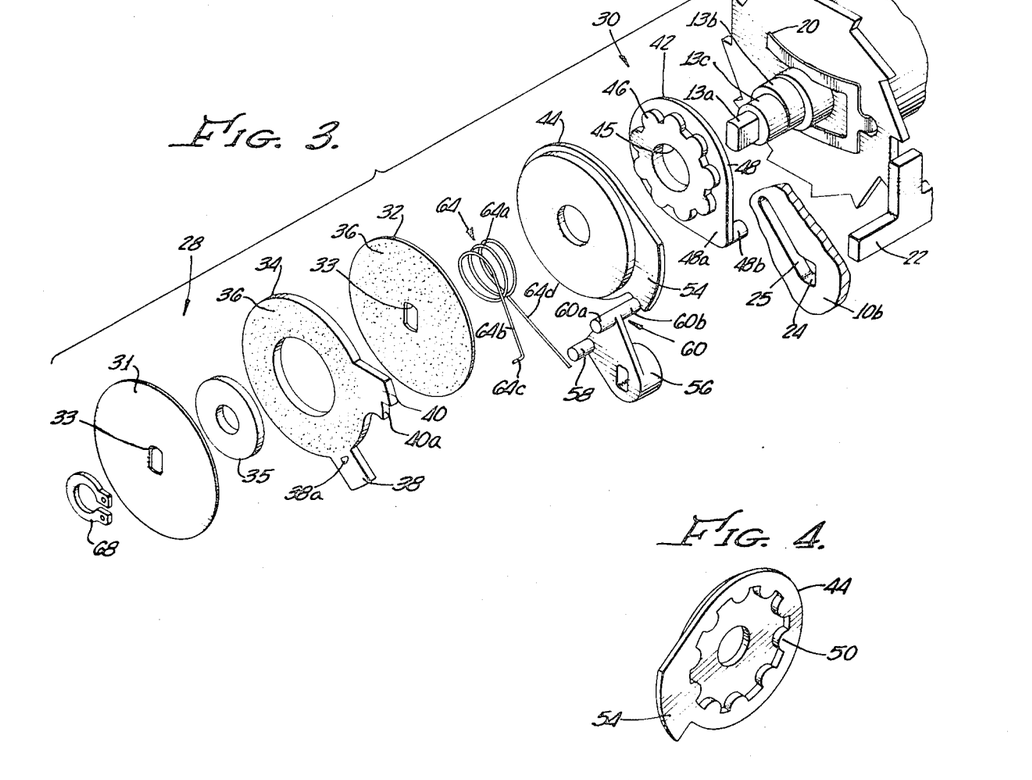
FIG. 3 is an exploded perspective view showing the stop sensitive mechanism and the reset mechanism.
FIG. 4 is a perspective view of the interior of the outer gear of the reset mechanism.
Figure 5:
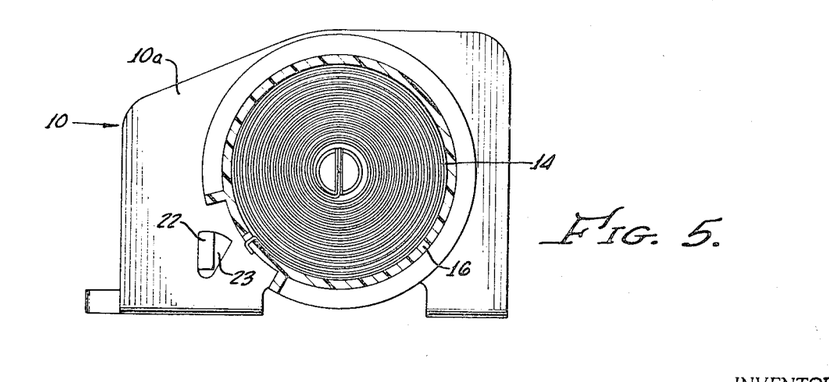
FIG. 5 is a cross-sectional view of the spring end of the retractor taken on line 5—5 of FIG. 2.

The spool ends of the reel are formed with ratchet teeth 21 to be engaged by a lock bar 22 having its ends pivotally mounted in the support 10. Referring to FIG. 5, the slot 23 in one leg of the support 10 can be seen to be dimensioned so as to permit the lock bar to pivot into and put of engagement with the ratchet teeth while being restrained from translational movement in the plane of the support legs. Referring to FIG. 3, the other slot 24 in the leg 10b is similar to the slot 23, but it also forms the end of an elongated slot 25 serving a different function.

The novel mechanisms of the invention are essentially enclosed within a housing 26 mounted on the left leg 10b of the support 10 as viewed in FIG. 1. Basically these include the stop sensitive mechanism of the invention generally indicated at 28 in FIG. 2, positioned on the outer end of the shaft 13, and a reset mechanism generally indicated at 30, positioned on the shaft 13 between the mechanism 28 and the support leg 10b.

Referring now to FIG. 3 as well as to FIG. 2, the stop sensitive mechanism 28 may be seen to include a pair of disks 31 and 32 which are provided with centrally located straight sided apertures 33 and mounted on a flat sided portion 13a of the shaft 13 to rotate with the shaft. Sandwiched between the disks 31 and 32 is a middle disk 34 rotatably mounted on a washer like spacer 35 which in turn is rotatably mounted on the shaft section 13a. A thin layer of grease or other viscous material 36 is applied to both faces of the middle disk 34 in contact with the rotating disks 31 and 32, the spacer 35 being slightly thicker than the disk to provide space for the viscous material. If desired, the spacer 35 can be formed integral with the disk 34, and with the same thickness as the disk, the viscous material would then provide its own spacing.

A pair of circumferentially spaced fingers 38 and 40 formed on the middle disk 34 extend radially beyond the periphery of the disks 31 and 32. A notch 40a is formed in the radially outer corner of the finger 40 on the edge facing the finger 38.

Still referring to FIG. 3, the reset mechanism 30 includes a pair of speed changing gears, an inner gear 42 and an outer gear 44. The inner gear 42 includes a central aperture 45 for mounting the gear on a circular section 13b which is eccentrically formed on the shaft 13. The outer gear 44 is mounted on a circular section 13c which is concentrically formed on the shaft.

The inner gear 42 includes a ring of radially extending teeth 46 mounted on a plate 48, the plate including a portion 48a which extends radially outwardly from the remainder of the plate. An axially extending pin 48b mounted on the plate extends into the elongated slot 25 formed in the leg 10b of the support 10. The pin 48b prevents rotation of the inner gear 42, but it permits the orbital movement of the gear produced by the eccentric section 13b of the shaft as the shaft rotates.

Referring now to FIG. 4, as well as to FIG. 3, it can be seen that the outer gear 44 is formed in the shape of a shallow cup like member having a ring of gear teeth 50 which are formed to mesh with the teeth 46 of the inner gear. The inner diameter of the ring of teeth 50 is sized to accommodate the orbital movement of the teeth 46 while continuing to mesh with the teeth. In the arrangement shown, the outer gear 44 is formed with 10 teeth 50 whereas the inner gear 42 is formed with nine teeth 46. Also formed on the outer gear 44 is a cam 54 which extends radially outwardly from the remainder of the outer gear and extends circumferentially about 45°.

Mounted on the end of the lock bar 22 which extends through the slot 24 in the support leg 10b is a crank arm 56 which forms an extension of the bar. The arm 56 includes a radially extending portion that extends between the stop sensitive mechanism 28 and the reset mechanism 30 having a pair of stop pins 58 and 60 mounted thereon extending parallel to the axis of the lock bar and parallel to the shaft 13. The stop pin 58 extends outwardly toward the pivotal disk 34 of the stop sensitive mechanism 28. The stop pin 60 includes one end 60a which extends toward the pivotal disk 34 and an opposite end 60b which extends to the other side into the rotational path of the cam 54 on the outer gear 44. The stop pins 58 and 60 are spaced a distance less than the distance between the fingers 38 and 40 of the pivotal disk 34, as may be seen from FIG. 12. As seen from FIGS. 2, 3 and 6, the other end 60b of the stop pin 60 is in the path of the cam 54.

Sandwiched between the rotating disk 32 and the outer gear 44 is a spring 64 which forms part of the stop sensitive mechanism. The spring has a central coiled section 64a which surrounds the shaft section 13c together with the outer gear 44. The spring 64 further includes a radially extending arm 64b having an axially extending segment 64c on its outer end which is positioned within a hole 38a in the finger 38 of the nonrotating disk 34. The other end of the spring 64 is in the form of an arm 64d which engages the stop pin 58 on the side of the pin 58 facing the stop pin 60a. The orientation of this spring 64 is such as to urge the finger 38 on the pivotal disk 34 towards and into engagement with the stop pin 58 into the position shown in FIG. 12. Thus, if the pivotal disk 34 is moved away from the stop pin 58, the spring 64 produces torque on the crank arm 56 to pivot the lock bar 22 into its locking position engaging the ratchet teeth 21 on the reel 12. Correspondingly, if the lock bar 22 is held in its unlocked position, the spring 64 produces torque on the pivotal disk 34 to cause it to move in a counter-clockwise direction as viewed in FIGS. 3 and 12.

The various components of the stop sensitive mechanism 28 and the reset mechanism 30 are axially confined on the shaft 13 between the support leg 10b and a suitable retaining element 68 which snaps over the end of the shaft section 13a. The spring central coiled section 64a is formed with its convolutions normally axially spaced and they are axially compressed when the retaining element 68 is in place. Thus the spring section 64a eliminates axial play in both the viscous drag assembly and the gear assembly.

OPERATION

Figures 8, 9, 10, 11, 12:
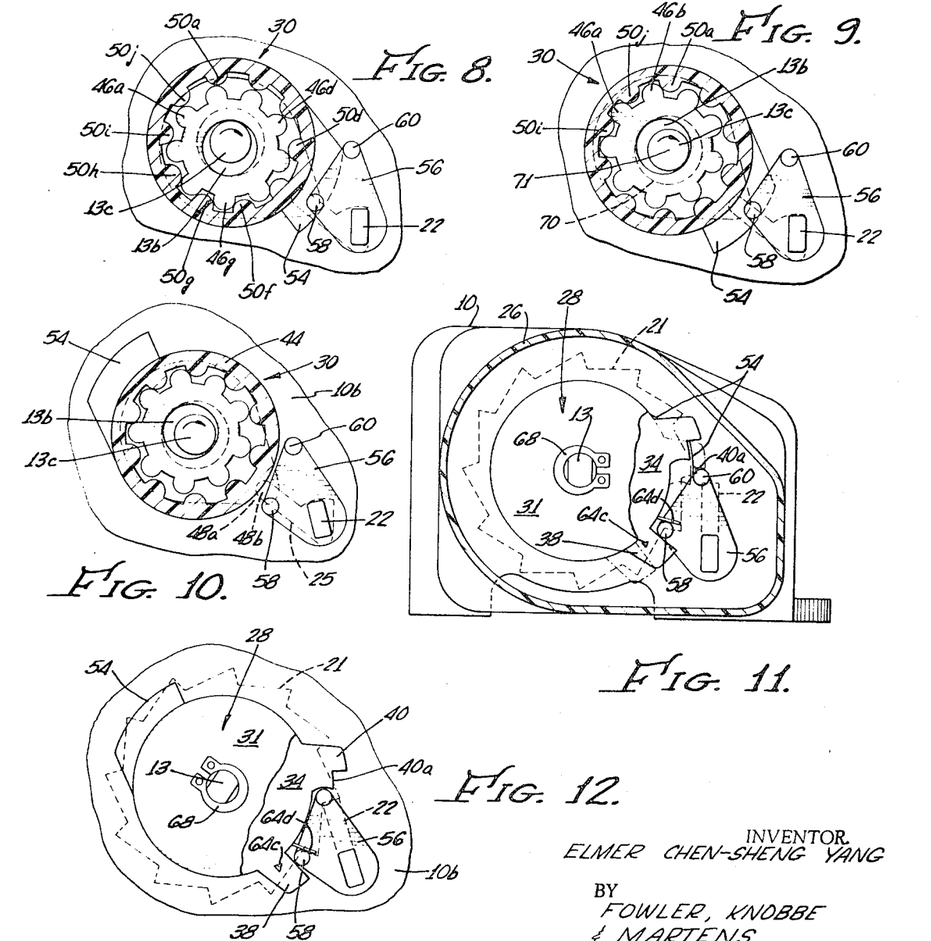
FIG. 11 is an end elevational view on line 11—11 of FIG. 2 illustrating the pivotal disk of the stop sensitive mechanism in its one extreme position in solid lines and in its other position in phantom lines and with the lock bar in its unlocked position.
FIG. 12 is a view similar to that of FIG. 11 but with the lock bar shown in its locked position.

When not in use, the seat belt 18 is normally fully wound on the reel 12 under the urging of the power spring 14. In this condition the lock bar 22 is in an unlocked position out of engagement with the ratchet teeth 21, as shown in FIG. 11. The major portion of the lock bar 22 is shown in dotted lines in FIG. 11 as are the ratchet teeth. The cam 54 on the outer gear 44 of the reset mechanism 30 is only partially seen in FIG.

Figure 6:
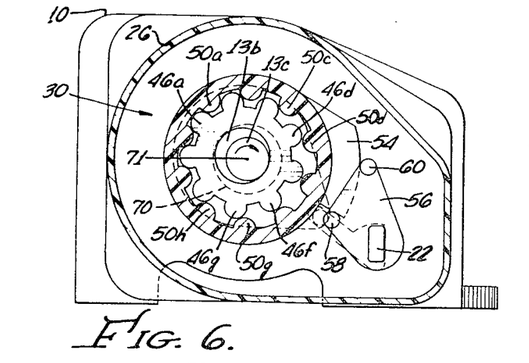
FIG. 6 is a cross-sectional view of the reset mechanism on line 6—6 of FIG. 2.

11, and for the sake of clarity is not shown in dashed lines. However, the cam 54 is shown in FIG. 6 engaging the pin 60 on the crank arm 56 attached to the lock bar 22 so that the lock bar 22 cannot pivot in a counter-clockwise direction as viewed in FIGS. 6 and 11, with the result that the lock bar is positively held in an unlocked condition. It should be noted that the lock bar 22 is normally in the unlocked position at this stage, in any event, due to the fact that the finger 38 on the pivotal disk 34 of the stop sensitive mechanism is urged into engagement with the stop pin 58 of the crank arm 56 by the spring 64 as shown in solid lines in FIG. 11; and, the non-rotating disk 34 has been urged into a counter-clockwise direction as the reel 12 was moving in a counter-clockwise direction while the belt was being retracted from its previous use.

Upon commencement of unwinding rotation of the reel 12, the stop sensitive mechanism 28 urges the lock bar 22 into its locked position. That is, by applying an unwinding force to the belt 18, the reel 12 is moved in a clockwise direction as viewed in FIG. 11. The disks 31 and 32 of the stop sensitive mechanism rotate with the reel and the viscous medium 36 between the rotating disks 31 and 32 produces torque through friction on the disk 34 causing it to want to follow the rotation of the rotating disks 31 and 32.

This torque moves the driven or pivotal disk 34 clockwise into the phantom line position shown in FIG. 11. The spring 64 through its arm 64d urges the pin 58 to follow the finger 38 on the disk 34, thus producing a force urging the lock bar 22 to pivot counter-clockwise into locking position. However, the cam 54 on the outer gear 44 of the reset mechanism 30 prevents movement of the bar 22. Further, the rotation of the disk 34 moves its finger 40 so that its notch 40a receives the stop pin 60 and thus prevents counter-clockwise movement of the lock bar 22 into the locking position. Thus, the reel with its disks 31 and 32 is free to continue to move in an unwinding direction. Further rotation of the disk 34, however, is prevented by the stop pin 60 within the notch 40a. Since the distance between axis of rotation of the disk 34 and the pivotal axis of the bar 22 is less than the distance between axis of the disk 34 and the notch 40a plus the distance between the axis of the bar 22 and the stop 60, the bar 22 and the disk 34 are in effect holding each other from further movement in this dynamic unwinding condition. Note that at the beginning of the unwinding movement, the lock bar 22 is held in the unlocked position, both by the cam 54 and the disk 34.

This unwinding rotation will cause the cam 54 to move in a clockwise direction also by virtue of the gears of the reset mechanism 30. More specifically, referring to FIG. 6, the clockwise rotation of the shaft 13 causes its eccentric section 13b to move in an orbital path carrying the inner gear 42 of the reset mechanism. Since the inner gear 42 is restrained from rotation by virtue of its pin 48b being held in the slot 25 of the support leg 10b, the gear teeth 46 simply remain in the position indicated in FIG. 6 except that the entire gear moves in an orbital path, as indicated by the broken line 70 in FIG. 6. This causes the teeth 46 on the inner gear 42 to "walk" around the interior of the outer gear 44 engaging its teeth 50. Since the outer gear 44 has one more tooth 50 than does the inner gear 42, one revolution of the eccentric 13b causes the outer gear 44 to move through a distance of one tooth and one space in a clockwise direction. This movement in turn causes the cam 54 to be moved that amount. Thus, sufficient unwinding movement will cause the cam 54 to move out of engagement with the stop pin 60 connected to the lock bar with the result that the lock bar will no longer be positively held in the unlocked position by the cam.

To further explain the operation of the gears of the reset mechanism, they are shown in various operational conditions in FIGS. 6 through 10. In FIG. 6 tooth 46a of the inner gear is shown in full mesh between teeth 50a and 50j of the outer gear. Tooth 46a is in this position because the portion of the eccentric 13b which is furthest from the axis 71 of rotation of the shaft 13 is at that time radially aligned with the tooth 46a. However, the tooth 46d is not in complete meshing relation with the teeth 50c and 50d of the outer gear.

Figure 7:
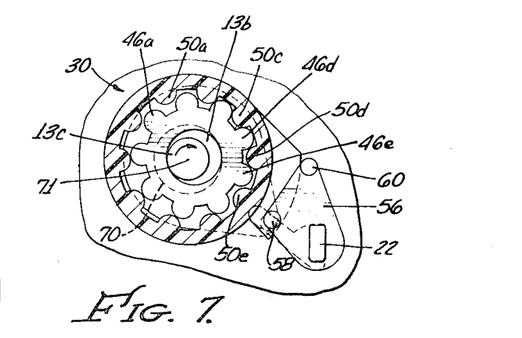
FIG. 7–10 are cross-sectional views on line 6—6 showing the gears of the reset mechanism in various operational positions with respect to each other and the lock bar.

However, turning to FIG. 7 it can be seen that the eccentric 13b has rotated counter-clockwise a little less than half a revolution to a point where tooth 46d is now fully meshed between the teeth 50c and 50d of the outer gear. Thus it can be appreciated that the outer gear has been rotated in a clockwise direction a distance slightly less than one tooth during rotation of the eccentric 13b through a little less than ½ revolution. The corresponding movement of the clockwise movement of the cam 54 can be seen by comparing the relative position of the stop 60 on the cam 54 between FIG. 6 and FIG. 7. In FIG. 7 the stop 60 is nearing the trailing edge of the cam 54. The lock bar 22 is still held in unlocked position by the cam in FIG. 7.

Referring to FIG. 8, the eccentric 13b continues to rotate in a clockwise direction causing the inner gear tooth 46g to move into full mesh between the teeth 50g and 50f of the outer gear. By comparing position of the teeth of FIG. 6 with that of FIG. 8, it can be seen that the tooth 46g of the inner gear was ahead of the tooth 50g in FIG. 6, but that the outer gear has rotated into the position of FIG. 8 where the tooth 50g of the outer gear is ahead of the tooth 46g of the inner gear. Correspondingly the stop 60 on the crank arm 56 is shown at the trailing edge of the cam 54 still positively holding the lock bar 22 in an unlocked position.

In FIG. 9, the eccentric 13b has now completed one revolution so that it is back to the position shown in FIG. 6. The outer gear, however, has been rotated an angular distance of that between corresponding points on two adjacent teeth of the teeth 50 of the outer gear. Thus, the tooth 46a of the inner gear is shown in FIG. 9 in complete mesh between the teeth 50i and 50j of the outer gear while the tooth 50a has moved from a position immediately in front of the tooth 46a, as in FIG. 6, to a position immediately in front of the tooth 46b as shown in FIG. 9.

Since there are ten teeth 50 in the outer gear and nine teeth 46 in the inner gear, it can be seen that one revolution of the eccentric 13b has rotated the outer gear a fraction of a revolution about the concentric shaft section 13c. The denominator of the fraction being the number of teeth in the outer gear or 10 and the numerator being the difference between the outer and the inner, or 1. Hence, in the present case this is a ten to one speed reduction which has been obtained by utilizing only two gears. Advantageously, the rounded gear teeth need not have a precision fit for this kind of meshing and can be molded of plastic. Such manufacturing conveniences are of great importance in high volume production. Moreover, if desired, greater speed reduction can be obtained by increasing the number of teeth in the two gears while still having the outer gear with one more tooth than the inner. The desired speed reduction is balanced with the circumferential length of the cam 54 to provide the desired amount of unwinding rotation of the belt in which the lock bar 22 is positively held in the unlocked position by the cam. For a typical lap belt operation, it is desirable that the belt can be unwound about 8 to 10 inches before locking can possibly take place in that a belt must usually be unwound at least that amount to be latched with its mating buckle. Thus is can be seen that this so called "dead zone" of the locking mechanism can be easily set for whatever amount of belt unwinding is desired.

Continued unwinding rotation slowly moves the cam 54 away from the pin 60, as may be seen in FIG. 10. It should be noted that the cam does not rotate far enough to engage the stop pin 60 a second time during unwinding of the belt in that this would interfere with the locking function of the retractor. Thus it is important that the reset mechanism 30 be capable of providing adequate speed reduction since the reel revolves many times in unwinding a belt, for most applications.

Returning now to the operation of the stop sensitive mechanism 38, as has been described in connection with FIGS. 9 and 10, the lock bar 22 is no longer held by the cam 54, but so long as the belt is being continually unwound with sufficient velocity to hold the disk 34 through the viscous medium, in the position indicated by the phantom lines in FIG. 11, the lock bar 22 continues to be held in the unlocked position by the notch 40a in the finger 40. That is, the viscous drag, caused by the unwinding velocity, must continue to be greater than the force of the spring 64 acting on the disk in the other direction.

Once the desired amount of belt has been unwound so that the disks 31 and 32 of the stop sensitive mechanism stop moving, the spring arm 64d senses the substantial reduction in velocity upon interruption of movement, with the result that the spring quickly snaps the finger 38 and the pin 58 into engagement, releases the pin 60 from the notch 40a in the finger 40 and snaps the lock bar 22 into locked position. If unwinding tension is once more applied to the belt, the lock bar 22 due to the urging of the spring 64, is held in the locked position with the ratchet teeth.

In unwinding or drawing out of a seat belt, the user often pulls out more belt than is needed; and after the belt is buckled and released, the power spring 14 of FIG. 2 will automatically retract the belt into a snug condition on the user. More specifically, this retracting movement causes the reel to move in a counterclockwise direction as viewed in FIG. 11, which in turn causes the disks 31 and 32 to move with the reel, and the viscous connection between the disks 31 and 32 and the disk 34 produces a counter-clockwise torque on the disk 34. This causes the disk 34 to pivot with its finger 38 moving the pin 58, and thus pivoting the lock bar clockwise into its unlocked position. Thus, the belt is free to retract and advantageously the retracting occurs free of ratchet noise. The movement of the lock 22 is limited by the support 10, and thus the pin 58 being engaged by the finger 38 limits winding movement of the disk 34.

If now the vehicle is subjected to rapid deceleration causing the user of the seat belt to be thrown forwardly applying sudden tension on the belt, a torque is immediately produced on the reel 12 and on the disks 31 and 32 attached to the reel shaft which produces a torque through the viscous medium 36 on the disk 34, and causes the disk 34 to start to move in a clockwise or unwinding direction. The spring arm 64d urges the stop pin 58 to follow the finger 38 with the result that a torque is produced on crank arm 56 snapping the lock bar 22 into locking position so that it engages the next ratchet tooth. This condition is shown in FIG. 12. Note also, referring to FIG. 10, the movement of the lock bar within its slot in the support leg 10b and the fact that the cam 54 is not in position to restrict movement of the lock bar into the locking position. If the tension remains on the seat belt, the lock bar will remain in the position shown in FIG. 12. However, if the tension is relaxed so that there is any slight retraction of the belt as produced by the power spring 14, the disk 34 will move in a counter-clockwise direction a slight amount due to the torque produced by the rotating disks 31 and 32 which will move the lock bar into the unlocked solid line position of FIG. 12 once again. This occurs because the torque resistance of the lock bar is less than the torque produced by the viscous medium. If tension is once more applied to the belt, the lock bar will immediately snap into locked position to prevent further unwinding of the belt.

When the seat belt is unbuckled and released, the power spring 14 automatically rotates the reel in a winding direction until the belt is fully wound. During this winding movement the reset mechanism 30 functions in a reverse direction from that described above so that the cam 54 returns to the position shown in FIG. 6 once more holding or blocking the lock bar in its unlocked position so that the seat belt is once more in condition to be unwound.

What is claimed is:

1. A retracting device comprising a support, a storage member rotatably mounted on the support, a flexible restraining element wound on the storage member, power means urging the storage member in the direction to wind the restraining element on the storage member, lock means mounted on the support and movable into position to prevent the storage member from rotating to unwind the restraining element after initial unwinding, and means for initiating operation of said lock means solely upon the stopping of the unwinding rotation of the storage member and thereby prevent further unwinding of the restraining element.

2. A retracting device comprising a support, a storage member rotatably mounted on the support, a flexible restraining element wound on the storage member, power means urging the storage member in the direction to wind the restraining element on the storage member, lock means mounted on the support and movable into position to prevent the storage member from rotating to unwind the restraining element after initial unwinding, and means sensitive to the stopping of the unwinding rotation of the storage member to initiate operation of said lock means and thereby prevent further unwinding of the restraining element, said stop sensitive means includes means for urging said lock means into operation as unwinding force is applied to the restraining element, and means responsive to unwinding movement of the restraining element to block the operation of the lock means during initial unwinding movement from a fully wound position, said stop sensitive means sensing the stopping of the unwinding motion to release the lock means and thereby allow the lock means to prevent further unwinding.

3. A retracting device comprising a support, a storage member rotatably mounted on the support, a flexible restraining element wound on the storage member, power means urging the storage member in the direction to wind the restraining element on the storage member, lock means mounted on the support and movable into position to prevent the storage member from rotating to unwind the restraining element after initial unwinding, and means sensitive to the stopping of the unwinding rotation of the storage member to initiate operation of said lock means and thereby prevent further unwinding of the restraining element, said stop sensitive means includes movable means mounted on said storage member in a manner to move from a first position to a second position during initial unwinding rotation of the storage member, and spring means for urging the movable means to the first position upon stopping of the initial unwinding rotation of the storage member, the urging by said spring being used to initiate operation of the locking means.

4. The device of claim 3 wherein said movable means renders the lock means ineffective when in said second position.

5. The device of claim 3 wherein said movable means comprises a disk rotatably mounted on the storage member to pivot between said first and second positions, the disk being movable by frictional engagement with means fixed to rotate with the storage member.

6. The device of claim 3 wherein said spring means urges said lock means into locking position as it urges the movable means towards its first position.

7. The device of claim 1 including reset means for rendering the lock means ineffective as the restraining element approaches its fully wound condition.

8. A safety belt retractor including a support, a reel mounted on the support, a belt mounted on the reel, a retraction spring mounted on the support urging the reel in a direction to retract the belt, a lock mounted on the support for preventing unwinding of the belt, the improvement comprising:
  means for rendering the lock ineffective when the belt is retracted so as to permit initial unwinding of the belt, said means being rendered ineffective after a predetermined initial amount of unwinding rotation of the belt; and
  stop sensitive means for keeping the lock ineffective as the belt is being unwound and including means responsive solely to the interruption of the unwinding rotation of the reel for releasing the lock to prevent further unwinding of the belt after the interruption.

9. A safety belt retractor including a support, a reel mounted on the support, a belt mounted on the reel, a retraction spring mounted on the support urging the reel in a direction to retract the belt, a lock mounted on the support for preventing unwinding of the belt, the improvement comprising:
  means for rendering the lock ineffective when the belt is retracted so as to permit initial unwinding of the belt, said means being rendered ineffective after a predetermined initial amount of unwinding rotation of the belt;
  stop sensitive means for keeping the lock ineffective as the belt is being unwound and for sensing the interruption of the unwinding rotation of the reel for releasing the lock to prevent further unwinding of the belt after the interruption, said stop sensitive means includes:
  a first disk mounted to rotate with the reel;
  a second disk pivotally mounted on the same axis as the rotating disk, the disks being positioned in face to face relation with a layer of viscous material in between such that rotation of the rotating disk causes the pivotally mounted disk to rotate to the extent of its limited movement, the movement of said pivotally mounted disk which occurs during the unwinding movement of the reel being utilized to hold the lock out of engagement with the reel when the belt is initially withdrawn from a fully retracted position; and
  spring means urging said pivotally mounted disk in a belt winding direction against the drag of the viscous material to release the lock bar when the unwinding movement of the belt is interrupted, the spring means urging the pivotally mounted disk to move against the drag of the viscous material to release the lock.

10. The retractor of claim 8 wherein said means for rendering the lock ineffective when the belt is retracted includes cam means movable in response to rotation of the reel.

11. A safety belt retractor including a support, a reel mounted on the support, a belt mounted on the reel, a retraction spring mounted on the support urging the reel in a direction to retract the belt, a lock mounted on the support to be urged into engagement with the reel to prevent protraction of the belt, the improvement comprising:
  a first disk mounted to rotate with the reel;
  a second disk mounted on the same axis as the first disk but being mounted to rotate independently of the reel, the disks being positioned in face to face relation with a layer of viscous material in between such that rotation of the first disk causes the second disk to rotate because of the viscous material;
  an extension fixed to move with the lock;
  a finger formed on said second disk engaging the extension for holding the lock out of engagement with the reel once the belt is started to be unwound from a retracted position;
  spring means urging said second disk into position with respect to said extension to move the lock into engagement with the reel when the unwinding movement of the belt is interrupted; and
  cam means for engaging said extension to hold the lock out of engagement with the reel when the reel has been rotated to a position wherein the belt is substantially fully retracted to permit initial unwinding.

12. The retractor of claim 11 including reset means responsive to rotation of the reel for moving said cam means.

13. The retractor of claim 12 wherein said reset means comprises a pair of speed reducing gears positioned adjacent one end of said support and adjacent said disks, and with said extension being positioned between the gears and the disks, said spring means being coiled around the shaft between the disk and the gears and having one end linked to the second disk and the other end engaging the lock extension.

14. A safety belt retractor including a support, a reel having a shaft mounted on the support having ratchet teeth mounted to rotate with the reel, a belt mounted on the reel, a retraction spring mounted on the support urging the reel in a direction to retract the belt, a lock bar mounted on the support being movable into engagement with the ratchet teeth to prevent unwinding of the belt, the improvement comprising:

a pair of disks mounted on one end of the reel shaft to rotate with the shaft;

a disk rotatably mounted on the shaft between and in face to face contact with said pair of disks and with viscous material between the contacting surfaces of the disks such that rotation of the pair of disks urges the middle disk to rotate with them because of the viscous material, said stop sensitive disk having a pair of circumferentially spaced fingers extending radially beyond the periphery of the pair of disks;

a crank arm mounted on an end of said lock bar to form an extension of the bar, said crank arm having a pair of spaced pins which extend parallel to the reel shaft and are positioned between the fingers of said middle disk in the rotational path of the fingers to thereby form two stops for limiting the movement of the middle disk to pivotal action, one of the pins limiting the movement of the middle disk in a belt unwinding direction and the other pin limiting the movement in winding direction; and a spring urging the pin which limits the movement of the middle disk in the belt winding direction into engagement with the adjacent finger of the middle disk said spring urging the middle disk in the belt winding direction and urging the lock bar into locking position when unwinding tension is applied to the belt.

15. The retractor of claim 14 wherein the finger on said middle disk which engages the pin that limits unwinding movement of the middle disk includes a notch formed to receive said pin which limits unwinding movement when the middle disk is urged to move in an unwinding direction, the notch serving to prevent movement of the lock bar into locking engagement with the ratchet teeth.

16. The retractor of claim 14, a reset mechanism mounted on said shaft for holding said lock bar out of engagement with the ratchet teeth when the belt approaches its fully wound condition, said reset mechanism including gear means movable in response to rotation of the shaft and cam means movable by said gear means in a path to engage said lock bar extension and hold the lock bar out of engagement with the ratchet teeth when the belt approaches its fully wound position.

17. The retractor of claim 16 wherein said cam means is mounted on one of the gears and said gear means includes two gears which reduce the rotational speed of the shaft such that the cam means only restricts movement of the lock bar when the belt is substantially fully wound on the reel.

18. The retractor of claim 16 wherein said shaft has an eccentrically mounted section; and said gear means includes an inner gear mounted on said eccentric section, the inner gear being attached to said support in a manner to restrain the gear from rotation while permitting it to move in the orbital path produced by the rotation of said eccentric section, said inner gear including a plurality of radially extending teeth, and an outer gear rotatably and concentrically mounted on the shaft, a plurality of teeth forming a ring surrounding the teeth on said inner gear and arranged and shaped so that the inner gear teeth mesh with the outer gear teeth as the inner gear moves in its orbital path, the outer gear having more teeth than the inner gear so that it is rotated as the shaft rotates but at a reduced rate of speed, and said cam means is rotated by said outer gear.

19. In a retractor having locking means for preventing unwinding of a flexible element such as a belt on a reel, an improved means for rendering the locking means ineffective in a predetermined zone of the unwinding movement of the belt comprising:

an inner gear having a ring of outwardly extending teeth;

an outer gear having teeth dimensioned to mesh with the teeth of the inner gear and arranged in a ring surrounding the inner gear teeth with the outer gear having more teeth than the inner gear, the gears being rotatably mounted on the shaft of the belt reel, said shaft having means for eccentrically mounting the gears with respect to each other, means restraining one of the gears from rotation while the other is permitted to rotate, the diameter of the ring formed in the outer gear being such that the orbital movement produced by the eccentric mounting causes the teeth of the inner gear to mesh with the teeth of the outer gear during the orbital movement, said orbital movement causing rotational movement of the gear which is free to rotate at a rotational speed which is less than that of the shaft; and cam means moved by said rotating gear and located so that the movement of the cam is used to render the lock means ineffective in said zone.

20. The retractor of claim 19 wherein the speed reduction obtained by the gear mechanism and the circumferential length of the cam means on the outer gear are selected such that the cam means functions to render the lock means ineffective during a single zone of operation of the retractor but does not interfere with the locking function during the remaining operation of the retractor.

21. The retractor of claim 19 wherein said inner gear is eccentrically mounted on the shaft while the outer gear is concentrically mounted on the shaft, said inner gear is restrained from rotation but is permitted to move in its orbital path produced by the eccentric mounting whereby the orbital movement of the inner gear produces rotation of the outer gear, one cycle of the inner gear being moved through its orbital path producing a fraction of one revolution of the outer gear, the numerator of said fraction being the difference between the number of teeth in the inner gear and the outer gear and the denominator of the fraction being the number of teeth in the outer gear.

22. The retractor of claim 21 wherein:

the teeth of said inner gear are mounted on a plate which extends in a plane adjacent the plane of the gear teeth and the plate includes a portion which extends radially outwardly from the gear teeth with said portion having a restraining pin extending parallel to the axis of the gear and received in an elongated slot which restrains rotation of the gear but permits orbital movement of the gear; and said outer gear is in the form of a cup shaped member which fits over the teeth of the inner gear and mates with the plate of the inner gear to thereby form an enclosed housing for the gear teeth.

23. In a seat belt retractor having locking means for preventing unwinding of a flexible element such as a belt on a reel, an improved means for rendering the locking means ineffective in a predetermined zone of unwinding movement of the belt comprising: 1
   a first gear cycically driven by the rotation of said reel and a second gear rotated by said first gear;
   cam means driven by the second gear to render the locking means ineffective in said zone; and
   said gears being constructed and arranged to reduce the speed of rotation of the second gear to a fraction of that of one cycle of the first gear, the numerator of said fraction being the difference between the number of teeth in the first gear and the second gear and the denominator of the fraction being the number of teeth in the second gear.

24. The retractor of claim 23 including means responsive to interruption of the initial unwinding movement for initiating operation of said locking means, and said cam means functions to render the locking means ineffective when said belt is in the fully retracted position.

25. A safety belt retractor including a support, a reel having a shaft rotatably mounted on the support, a belt mounted on the reel, a retraction spring mounted on the support urging the reel in a direction to wind the belt on the reel, lock means mounted on the support being movable into engagement with the reel to prevent unwinding of the belt, a disk rotatably mounted with respect to the reel, friction means interconnecting the disk and the reel to cause rotation of the disk in response to rotation of the reel, a pair of stops cooperating with the disk for limiting rotation of the disk to pivotal movement between the stops, spring means for urging the disk against the stop which limits movement in the belt winding direction, and means interconnecting the disk to the lock means in a manner such that the rotation of the disk in the winding direction caused by said spring means initiates operation of the lock means after the belt has been initially unwound a desired amount and the unwinding movement interrupted.

26. The retractor of claim 25 wherein said lock means comprises a lock bar pivotally mounted on said support movable into and out of engagement with the reel and said interconnecting means includes a lock bar extension arm mounted on one end of the bar, said stops being formed on said lock bar extension arm, and said spring means urges the lock bar into locking position with the reel.

27. The retractor of claim 26 including a disk fixed to rotate with the reel positioned adjacent said pivotal disk with a layer of viscous material between the two disks for driving the pivotal disk.

28. In a seat belt having a belt wound on a reel under the urging of a spring or other power means and lock means for preventing unwinding of the belt, a method of automatically preventing additional unwinding of the belt after the belt has been initially unwound a desired amount comprising the steps of
   sensing the stopping of the initial unwinding rotation of the reel; and
   initiating operation of the lock means solely in response to the sensing of the stopping of the unwinding rotation.

29. In a seat belt having a belt wound on a reel under the urging of a spring or other power means and lock means for preventing unwinding of the belt, a method of automatically preventing additional unwinding of the belt after the belt has been initially unwound a desired amount comprising the steps of:
   sensing the stopping of the initial unwinding rotation of the reel;
   initiating operation of the lock means in response to the sensing of the stopping of the unwinding rotation;
   driving a disk in the belt unwinding direction through rotation of the reel against the urging of a second spring, the disk being mounted so it can rotate independently of the reel in response to the urging of the second spring; and
   initiating operation of the lock means through the movement of said disk caused by the second spring upon interruption of the initial unwinding rotation of the reel.

30. The retractor of claim 23 including means for driving said first gear in an orbital path and means for restraining the first gear from rotating.

31. The retractor of claim 30 wherein said first gear has a ring of outwardly extending teeth and said second gear surrounds the first gear and has a ring of inwardly extending teeth that mesh with the teeth of the first gear as it is moved in its orbital path.

* * * * *

Disclaimer 3,746,274.—*Elmer Chen-Shen Yang*, Anaheim, Calif. STOP SENSITIVE RE-
TRACTOR. Patent dated July 17, 1973. Disclaimer filed Mar. 8, 1974,
by the assignee, *Pacific Scientific Company*.
Hereby enters this disclaimer to claims 1, 2, 7, 8, 25, 27, 28 and 29 of said patent.

[*Official Gazette October 15, 1974.*]